Figure 1:
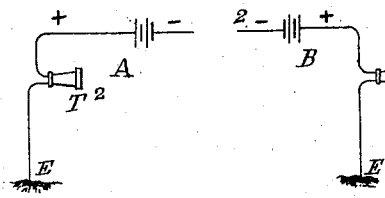

(No Model.) 2 Sheets—Sheet 1.

C. E. BUELL.
TELEPHONIC TELEGRAPH.

No. 248,136. Patented Oct. 11, 1881.

ATTEST:
John J. Diffley
J. W. Lockwood

INVENTOR:
Charles E. Buell

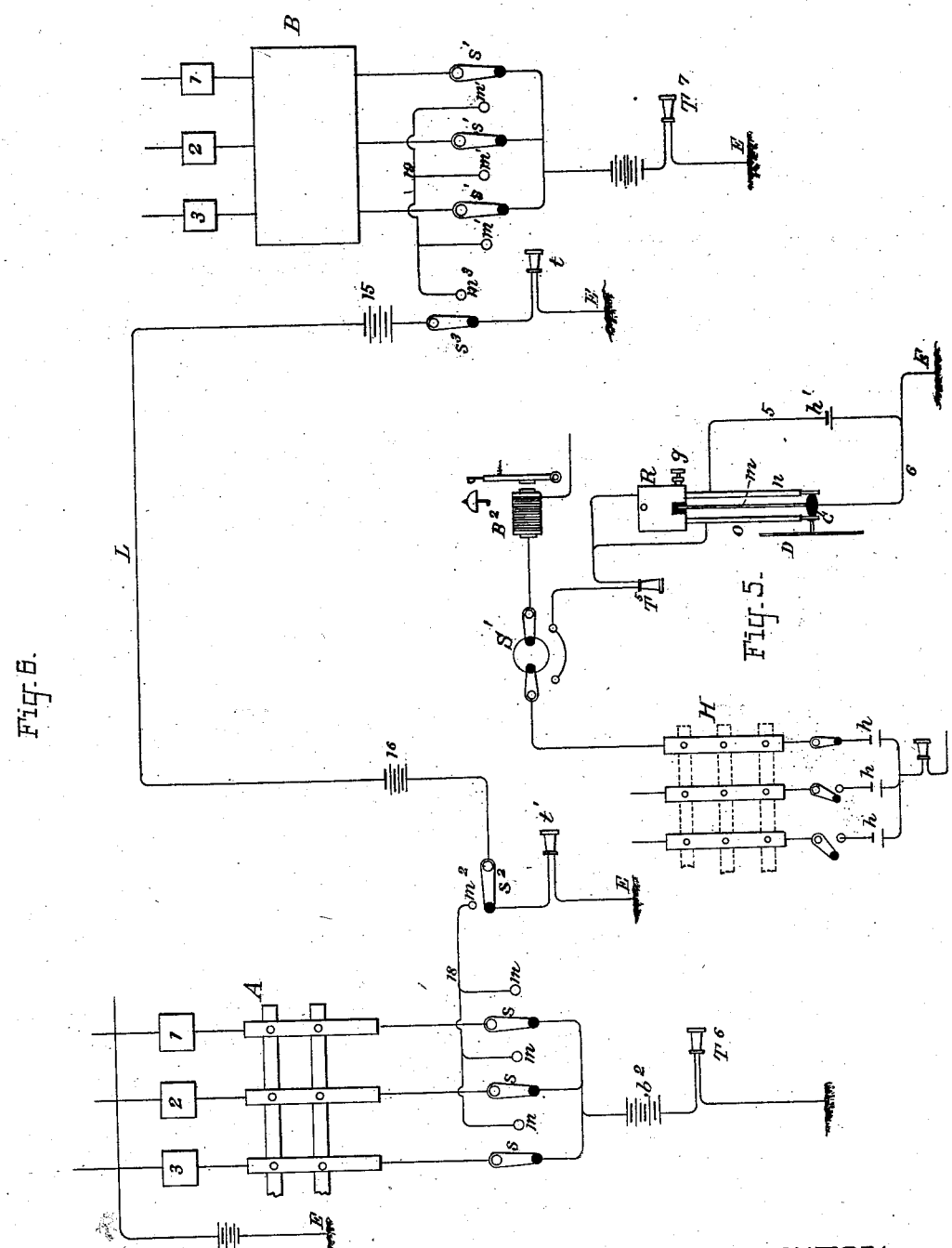

UNITED STATES PATENT OFFICE.

CHARLES E. BUELL, OF NEW HAVEN, CONNECTICUT, ASSIGNOR OF TWO-THIRDS TO JAMES G. SMITH, OF HACKENSACK, NEW JERSEY, AND GEORGE W. COY, OF MILFORD, CONNECTICUT.

TELEPHONIC TELEGRAPH.

SPECIFICATION forming part of Letters Patent No. 248,136, dated October 11, 1881.

Application filed February 7, 1881. (No model.)

*To all whom it may concern:*

Be it known that I, CHARLES E. BUELL, of the city and county of New Haven, and State of Connecticut, have invented a new and useful Improvement in Telephonic Telegraphs, of which the following is a specification.

My invention relates to a mode of charging telephonic circuits, and has for its object to give to the telephonic vibrations representing articulate speech an increased amplitude or variation of electrical force, and as a consequence increased variations of current strength in the receiving-instrument, and therefore louder articulation. As a further result of my invention I am enabled to dispense with the use of induction-coils, and yet make the telephone available as a means of communication over very long circuits.

My invention consists in placing upon a circuit over which telephonic communication is to be had opposed or neutralizing batteries; and in carrying out my invention I have adopted various methods of arranging such opposed batteries, some of which are set forth in detail hereinafter, and are shown in the drawings.

Figure 2:
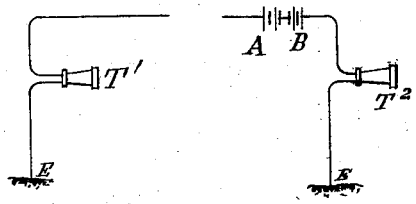
Figure 4:
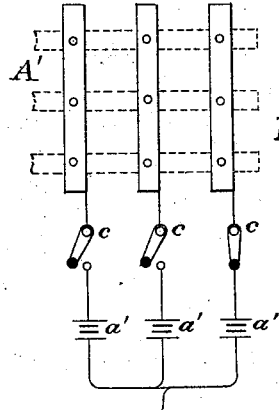
Figure 3:
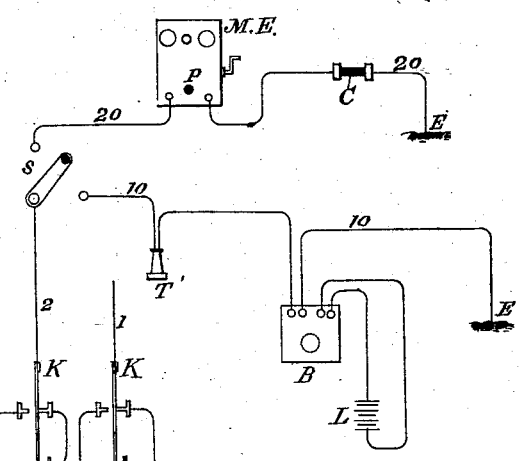
Figure 3:
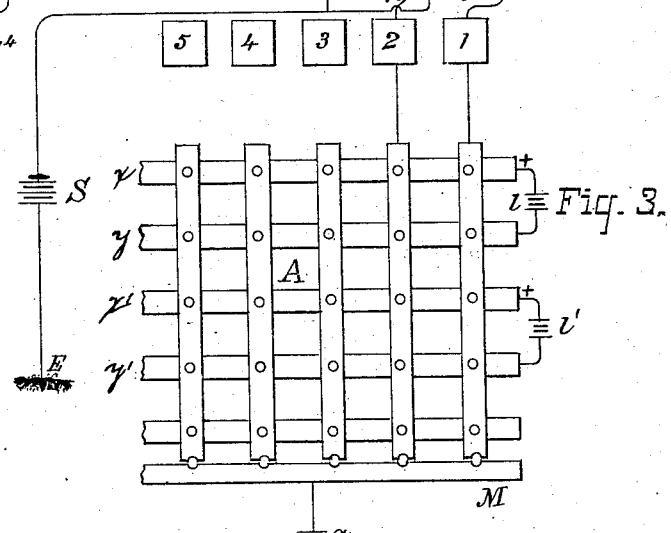

Figures 1 and 2 represent two methods of arranging the opposed batteries according to my invention in the simplest form. Fig. 3 represents a diagram of a telephone system or exchange and one plan of arrangement that may be used at subscribers' stations and at the central station. Fig. 4 is a modified arrangement of the batteries at a central station. Fig. 5 shows an arrangement in which the opposing battery is placed at the subscriber's station and the telephonic impulses or vibrations are set up by means of a battery-transmitter, which acts to short-circuit the battery to a greater or less extent at each vibration of the diaphragm. Fig. 6 is a diaphragm showing two distant central stations connected by a trunk-line.

In Fig. 1 I have shown two opposed batteries, A and B, placed at the opposite ends of a line, 2, and telephones $T'$ and $T^2$, which may be of the ordinary form known as "Bell" or "magneto" telephones, so that they may be used either as transmitters or receivers.

The batteries A and B, as represented, have the same pole to line, so that they oppose one another's action, and if they are of the same strength they will neutralize one another.

It is not to be understood that the batteries are necessarily of precisely the same electromotive force. One may be of less strength than the other; but if it is arranged with the same pole to line, so as to oppose the action of the battery at the other end, good results may be obtained. The telephonic currents from either of the telephones $T'$ $T^2$ transmitted over a circuit charged, as described, with either opposed batteries of the same or different strengths are received at the other end in the ordinary manner, but are found to produce in the receiving-instrument articulate sounds of greater volume than if transmitted through a simple circuit unprovided with the opposed batteries. When a circuit is charged by batteries of equal force, but with like poles to the line, and each battery is of a strength sufficient to charge the circuit to make operative an electro-magnet included in the circuit, such electro-magnet will cease to attract its armature, by reason of the neutralizing-currents which flow in opposite directions in its inclosing-helix; but the electro-magnet is in a far more delicate electrical condition than it is when included in a circuit not charged, and it is possible to make such electro-magnet operative by the increase or decrease of one of the neutralizing-batteries to an amount which upon the same circuit when not charged will not make such electro-magnet operative. It would seem that the reason why the augmentation of one or the other of the currents should result in giving out its full equivalent of force at a distance is that the usual loss occasioned by charging the wire and by escape is fully met by the batteries, while the condition of the magnet is more susceptible to slight changes in its inclosing-helix, and the entire absence of retained magnetism renders the articulation more defined and more audible.

The telephones $T'$ $T^2$ may obviously be battery or contact transmitters, in which case the transmitter itself would be in local circuit with a battery and the primary of an induction-coil, the secondary of which would be placed in the line-circuit after the well-known manner. The opposed batteries are found to add to the volume or amplitude of the received communication on a circuit equipped in this manner as well. Another arrangement of opposed batteries and communicating-instruments is shown in Fig. 5, and will be described farther on.

In Fig. 2 the opposed batteries A and B are at the same end of the line, but their relation electrically to one another and the circuit of which they form a part is, as will be observed, virtually the same as in Fig. 1.

In Fig. 3 I have shown a portion of a central-office switch-board and one of the subscribers' stations upon a line connected to the central office with an arrangement of opposed batteries that may be used in operating a telephone-exchange. The switch-board A is of ordinary construction, consisting of a number of parallel vertical and horizontal bars, perforated, as shown, for the reception of connecting-plugs. Each of the vertical bars is connected to a subscriber's line through drop-annunciators 1 2 3 4 5, and is also provided at its lower end with plug-sockets, as shown, to make connection with a horizontal bar, M, extending beneath the vertical strips and connected through opposed batteries $a$ and $b$ with a telephone, T, and the earth. The horizontal switch-bars are arranged in pairs, each pair $x$ $y$, $x'$ $y'$ connected, as shown, to opposed batteries $l$ $l'$. Each line in entering the annunciator passes through the back or upper contacts of keys or buttons K K', whose lower or front stops are connected to a common battery, S, and to earth. S is a signaling-battery to be used in calling subscribers.

The subscribers' station apparatus is shown on line 2, and consists of the following devices, shown for the sake of perspicuity in their simplest form.

T' is a telephone, and B an ordinary contact-transmitter, the primary of whose induction-coil is in circuit with the local battery L, and whose secondary is in the earth-connection 10, leading from one of the points of switch $s$ through the telephone T' to earth. The branch connected to the other point of switch $s$ contains an ordinary magneto-electric call-bell and generator, ME, whose button P serves to throw the generator into the circuit, and a carbon resistance, C. Each of the several lines connected to the central-office switch and telephone T' is equipped with the same apparatus.

The operation of the devices is briefly thus: In all the subscribers' lines the switch-levers should be connected to branch 20, so that the bell in any subscriber's wire may be operated by manipulating the appropriate key K K', &c., to throw in the signaling battery or generator at the central office. Should any subscriber desire to call the central office, he does so by putting his line to earth through line 10 and communicating orally with the central-office operator, who is constantly listening at telephone T. The carbon resistances C in the various lines prevent the diversion of the transmitted currents from the central-office receiving-telephone, and these currents pass to earth through the opposed batteries $a$ $b$. The listening telephone-operator having learned the name or number of the subscriber with whom communication is desired, directs that subscriber to be called, which is done by simply operating the proper key K, &c.

The operation of the key K, it will be observed, puts the signaling-battery S to line, but it also breaks the connection of that line with the annunciator and switch, thereby preventing battery S from dropping the annunciator-card. The switch-plugs at the bottom of the line-strips having been withdrawn to break the connection of the lines with the receiving-telephone, the subscribers may be then connected through either pair of bars $x$ $y$, $x'$ $y'$, by simply inserting the same or other plugs into the proper line-strips, one over bar $x$, and the other over bar $y$. The lines are thus connected through opposed batteries $l$. Any other two lines may be connected through opposed batteries $l'$ at the same time.

To indicate that disconnection is to be made at the central office, either subscriber connects his line to earth through branch 20, depresses button P, and operates the generator, thereby causing the annunciator-drops in the connected lines at the central office to fall.

The general features of the system just described I do not claim, as I am aware that an application for patent lately filed contains the same general arrangements of carbon resistance, lines, keys K, &c., annunciators, telephone T, and bar M.

It is obvious that as many pairs of connecting-bars $x$ $y$ and opposed batteries may be used as circumstances may render necessary, and that other means besides those shown might be employed for connecting subscribers' lines through opposed batteries at a central office.

It is plainly within the scope of my invention to use simple magneto-telephones instead of battery-telephones and induction-coils at the subscribers' stations; and it is also obvious that the opposed batteries may be used only between connected lines, and communication be held between subscribers and the central office by means heretofore used.

In Fig. 4 is shown a modified arrangement of opposed batteries at a central station. Each line, according to this plan, passes through its appropriate line-strip of the switch A', through switch-lever $c$, opposed batteries $a'$, and telephone T⁴ to earth. The batteries $a'$ $a'$ will prevent in large degree the diversion of the telephonic vibrations received from any line from the telephone T⁴, and the use of carbon resistances C would not then be absolutely necessary. The switch-levers $c$ serve to disconnect the line-strips of any two lines that are to be joined from the opposed batteries and the listening or receiving telephone. I contemplate the employment of the opposed battery in other systems besides that above described, and it may obviously be applied in conjunction with any receiving or transmitting telephone.

In the methods hereinbefore described of arranging the opposed batteries they have all been placed at the central station. A plan of arranging the opposing batteries one at the central and the other at a subscriber's station, as also a method of originating telephonic impulses or vibrations from the opposing battery by means of a contact-transmitter, is shown in Fig. 5. In this figure the central-office switch-board is shown at H, and each line is represented as connected to earth through a section of battery $h$, which has the same pole to line as the battery $h'$ at a subscriber's station.

S' represents a switch adapted to sever the continuity of the main line, and connect it to earth through a receiving-telephone, $T^5$, and a battery-transmitter.

$B^2$ is an ordinary electro-magnetic call-bell. The devices, so far as described, are of well-known construction, or are clearly shown in the drawings. The battery-transmitter is constructed and its connections are arranged in the following manner.

Two springs, $n$ and $o$, are supported from a pivoted block, R, held in position and capable of being adjusted by a set-screw, $g$. Each spring at its lower end has a conducting-face, and between the two faces is supported a piece of carbon, $c$, or other resistance-contact, hung from the block R by means of a spring or flexible support, $m$, insulated, as shown, from the block. The springs rest against the diaphragm D, so that the vibrations of the same will act to vary the degree or intimacy of contact between the carbon electrode and its embracing-springs, and so vary the resistance to the passage of the current in a manner well understood.

The battery $h'$ is connected by a wire, 5, to block R, or to one of the attached springs, and from the block a connection is carried to the switch S' and line. The other pole of the battery is connected by a wire, 6, to the carbon, and also has a ground-connection. It will thus be seen that when the switch S' is connected to the line two paths are open to the current from $h'$—one through the line to earth and back to the other pole of the battery, the other through $o$ and $n$, carbon $c$, and wire 6, the latter being a shunt or derived circuit to the former, the amount of resistance in which is varied at the points of contact between $c$ and $n$ and $o$.

As the resistance to the passage of the current at $c$ increases and diminishes in accordance with the movements of the diaphragm, the strength of current flowing to line will fall and rise in accordance with well-known laws, and the result is a series of pulsations or vibrations corresponding to said movements.

The batteries $h'$ and $h$, as will be observed, have the same pole to line, and hence oppose one another.

All the batteries at the various subscribers' stations in the various lines have the same poles to line, and hence when any two stations, either upon the same or different lines, are connected their batteries are opposed.

Other forms of transmitter besides that described may be used for varying the strength of current flowing to line from the opposing or neutralizing battery at the subscribers' station.

The battery $h'$ may be of such a size with relation to the opposed battery $h$ at the central station that its current will be normally the same in strength or greater or less than that of $h$.

In Fig. 6 are shown two central offices, A and B, connected by a trunk-line, L, provided with opposed or neutralizing batteries 15 and 16, and communicating-telephones $t$ $t'$.

The central-office switches may be of any desirable construction, the form shown consisting of vertical and parallel line-strips and horizontal parallel connecting-strips. Referring to station A, each line passes to ground through a switch-lever, $s$, and a common receiving-telephone, T, provided with opposed batteries.

In conjunction with switch-levers $s$ are a number of metallic studs, $m$, one for each line, connected by means of wire 18 to a stud, $m^2$, with which trunk-line switch-lever $s^2$ may be connected. The switches are normally in the position shown in the drawings, and the trunk-line telephones $t$ $t'$ are connected to line by the switches $s^2$ and $s^3$.

Should it be desired to connect a subscriber of office A with a subscriber of office B, notice of that fact is given by means of telephones $t'$ $t$, and the levers $s^2$ and $s^3$ turned to disconnect the trunk-line from the telephones $t$ and $t'$ and connect it to studs $m^2$ $m^3$. The appropriate switch-levers $s$ and $s'$ on the respective boards having been placed upon the proper studs $m$ and $m'$, the two lines are thereby connected through the trunk-line L and the opposed or neutralizing batteries 15 16, the circuit being as follows: Subscribers' line office A, switch-lever $s$, stud $m$, wire 18, stud $m^2$, lever $s^2$, battery 16, line L, battery 15, lever $s^3$, stud $m^3$, wire 19, stud $m'$, lever $s'$, and to subscribers' line of office B.

The above arrangement of opposed batteries and trunk-line may be used with advantage in connection with other central-office systems, and I contemplate the application of it to the systems now in use for connecting the subscribers of distant central offices.

A galvanometer or other well-known measuring device may be employed to determine when the batteries are adjusted to each other.

What I claim as my invention is—

1. A main electric circuit charged by opposed or neutralizing batteries, substantially as described, in combination with devices included in same circuit and adapted to set up electrical waves or pulsations therein corresponding to the sound waves or pulsations representing articulate speech, and receiving apparatus adapted to reconvert said electrical waves or pulsations into articulate sounds, as and for the purpose described.

2. At a central-office telephone-station, opposed or neutralizing batteries in a circuit to earth, in combination with switch devices for breaking the connection of the same with the subscribers' lines, substantially as described.

3. At a central-office telephone-station, opposed or neutralizing batteries, in combination with switch devices for connecting the same between any two subscribers' lines.

4. In a telephone-switch, opposed or neutralizing batteries joined to the horizontal connecting-strips, in combination with switch devices for joining any two subscribers' lines, the whole so connected that the act of coupling any two lines places the opposed batteries in circuit between them.

5. In a telephone-exchange system, the combination of two or more subscribers' lines, switch devices for connecting any two lines, and opposed batteries joined to the connecting switch devices, so that the act of coupling any two lines places the opposed batteries in circuit between them.

6. The combination, with two telephone-exchange systems, of two or more trunk-lines connecting said exchanges, devices for connecting either of said lines to either of the series of lines constituting said exchange systems for oral communication, and opposed or neutralizing batteries adapted to be included in the trunk-lines when the exchanges are thus connected, substantially as and for the purpose described.

7. In a trunk telephone-line joining two distant exchanges and provided with opposed batteries, a ground-connection at each end of said line containing a telephone, in combination with an electrical switch acting to break said ground-connection and connect the line to the switching devices of a telephone-exchange.

8. In a telephone-exchange switch-board, switch devices through which the lines pass to earth, in combination with electrical connections to a switch placed in a trunk-line provided with opposed or neutralizing batteries, substantially as described.

9. In a telephone trunk-line connecting two distant exchanges, opposed or neutralizing batteries, in combination with telephones placed in earth-connections from said lines, and switch devices located between the telephones and the opposed batteries and serving to break the ground-connection and establish a connection with the switch apparatus of a telephone-exchange system, substantially as described.

10. The combination, in the same electric circuit, of opposed or neutralizing batteries and a battery or contact transmitter in a shunt or derived circuit around one of said batteries, substantially as described.

11. In a telephone-exchange embodying two or more subscribers' wires connected to a central connecting-switch board, the combination, at each subscriber's station, of a battery or generator having the same pole to line at all the stations with a contact-transmitter acting to vary the amount of current flowing to line from said battery, substantially as described.

CHARLES E. BUELL.

Witnesses:
EVELYN L. BISSELL,
G. S. MOTT.